(12) United States Patent
Peng

(10) Patent No.: US 8,097,159 B1
(45) Date of Patent: Jan. 17, 2012

(54) PRESSURE FILTER TYPE WATER KETTLE

(75) Inventor: Pinhung Peng, Toufen Township, Miaoli County (TW)

(73) Assignee: Ming-Tsai Tsai, Taipei (TW)

( * ) Notice: Subject to any disclaimer, the term of this patent is extended or adjusted under 35 U.S.C. 154(b) by 274 days.

(21) Appl. No.: 12/607,775

(22) Filed: Oct. 28, 2009

(51) Int. Cl.
*B01D 35/26* (2006.01)

(52) U.S. Cl. ........ 210/244; 210/282; 210/293; 210/290; 210/416.3; 210/474

(58) Field of Classification Search ............... 210/137, 210/241, 244, 282, 293, 290, 416.3, 475, 210/477, 482; 222/189.06–189.11
See application file for complete search history.

(56) References Cited

U.S. PATENT DOCUMENTS 4,066,551 A * 1/1978 Stern .............................. 210/282
5,900,143 A * 5/1999 Dalton et al. .................. 210/192

* cited by examiner

*Primary Examiner* — Terry Cecil
(74) *Attorney, Agent, or Firm* — Jackson IPG PLLC; Demian K. Jackson

(57) ABSTRACT

A pressure filter type water kettle includes a kettle body for holding water, a pressure device holder mounted in the kettle body to close the top open side of the kettle body, a filter fastened to the bottom side of the pressure device holder and dipped in water in the kettle body, and a pressure device mounted in the pressure device holder and operable to apply compressed air to force filled water through a series of filter layers in the filter so that water is filtered into a drinkable condition.

10 Claims, 7 Drawing Sheets

PRESSURE FILTER TYPE WATER KETTLE

BACKGROUND OF THE INVENTION

1. Field of the Invention

The present invention relates to water kettles and more particularly, to a pressure filter type water kettle, which is manually operable by a user to force water in the kettle body move through a series of filter layers so that filtered water can be drunk directly.

2. Description of the Related Art

There are filter kettles commercially available. These filter kettles have a simple filter device mounted therein for filtering water. However, this type of simple filter device does not provide a satisfactory filtering effect. Water filtered through this type of simple filter device remains acidic, not very good to human health. Further, regular drinking water is boiled water. However, boiling water for drinking consumes a big amount of gas or electricity. Consuming gas energy or electricity is not environmentally friendly.

SUMMARY OF THE INVENTION

The present invention has been accomplished under the circumstances in view. It is one object of the present invention to provide a pressure filter type water kettle, which can be conveniently carried by a user for use at home, or in an outdoor activity such as mountain climbing, clinic or military operation, for treating city water or mountain water into drinkable water. It is another object of the present invention to provide a pressure filter type water kettle, which is practical for treating water into healthy drinking water without boiling, thereby helping energy-saving and carbon dioxide reduction.

To achieve these and other objects of the present invention, a pressure filter type water kettle comprises a kettle body for holding water, a pressure device holder mounted in the kettle body to close the top open side of the kettle body, a filter fastened to the bottom side of the pressure device holder and dipped in water in the kettle body, and a pressure device mounted in the pressure device holder and operable to apply compressed air into the kettle body and to further force water through a series of filter layers in the filter so that water is filtered into a drinkable condition.

In one embodiment of the present invention, the pressure device comprises a battery pack, a control switch, an air pump and a driver electrically connected to the battery pack through the control switch and controllable by the control switch to move the air pump.

In an alternate form of the present invention, a solar panel is used to provide the necessary working voltage to the driver.

In another alternate form of the present invention, the pressure device uses an AC power cable to obtain city power supply for an electromagnet for moving an air pump.

DETAILED DESCRIPTION OF THE INVENTION

Figure 1:
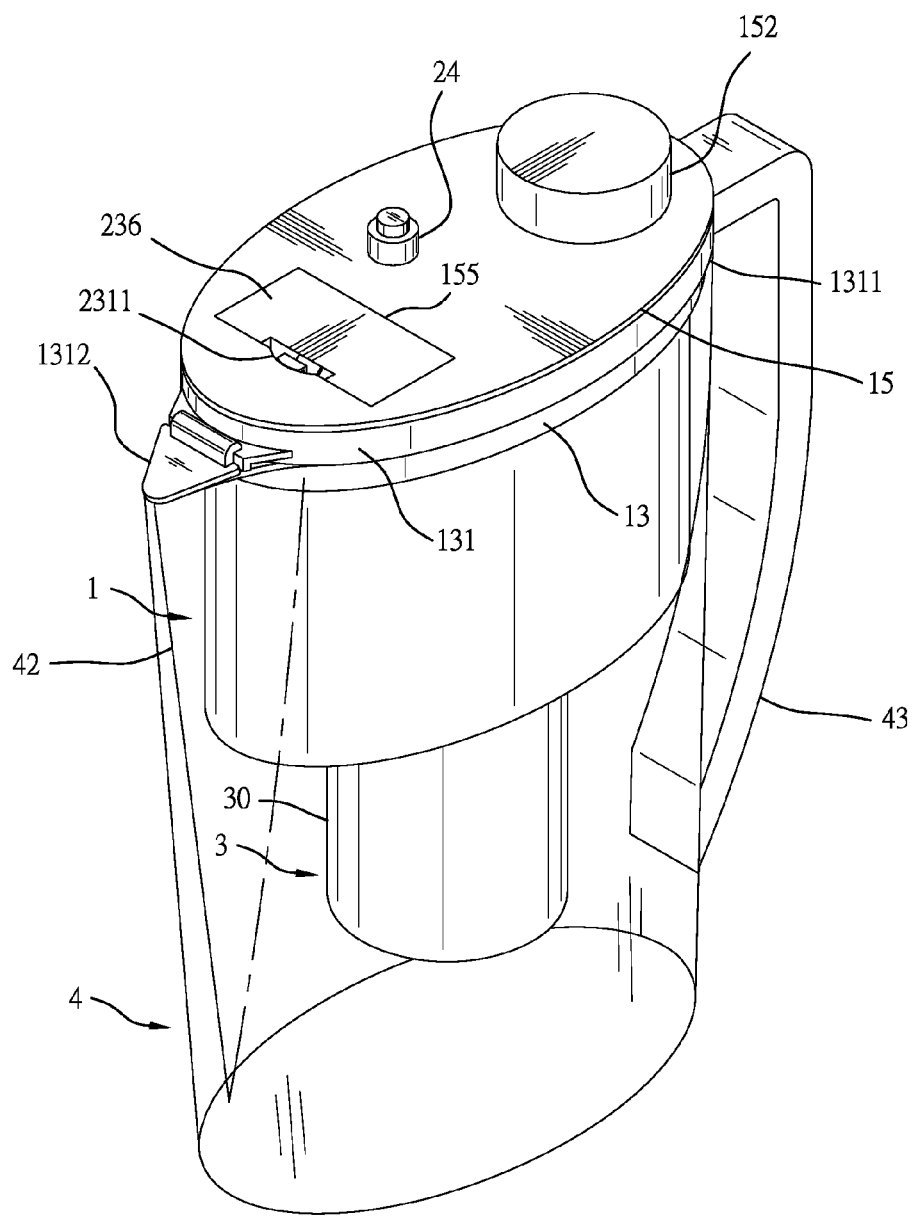
FIG. 1 is a perspective view of a pressure filter type water kettle in accordance with a first embodiment of the present invention.
Figure 2:
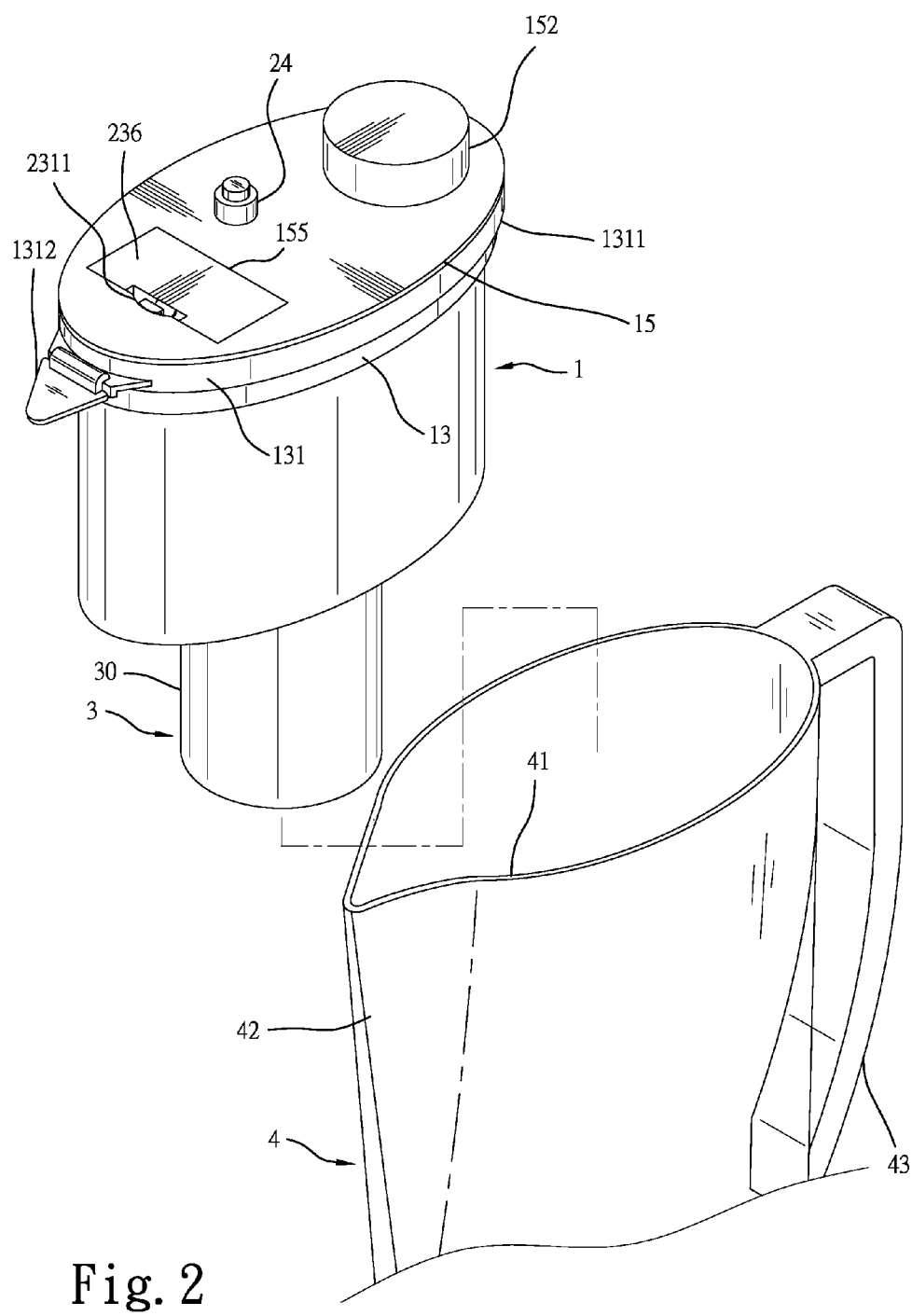
FIG. 2 is an exploded view of the first embodiment of the present invention, showing the kettle body separated from the other parts of the pressure filter type water kettle.
Figure 3:
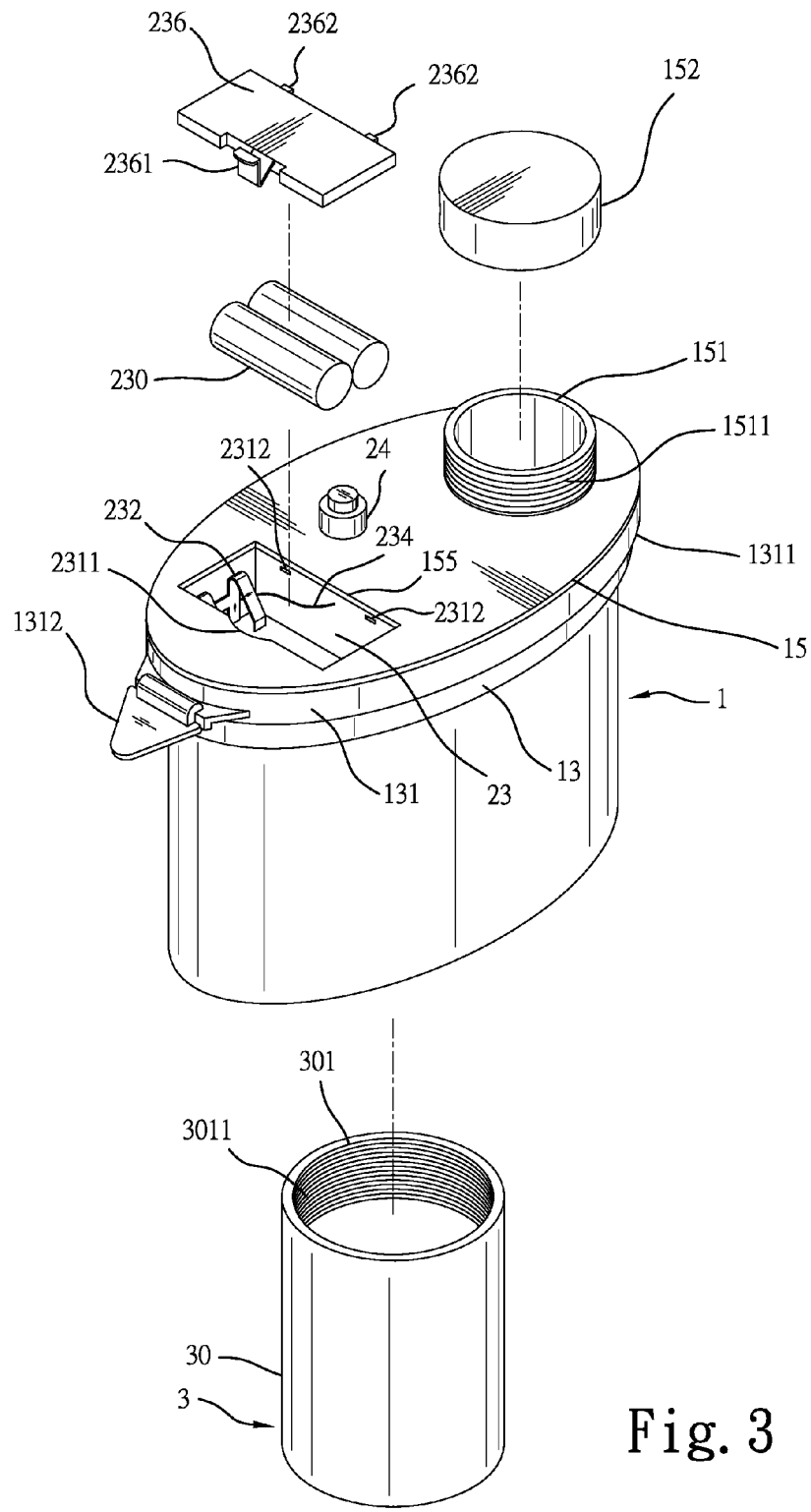
FIG. 3 is an exploded view of the pressure device holder, pressure device and filter of the pressure filter type water kettle in accordance with the first embodiment of the present invention.
Figure 4:
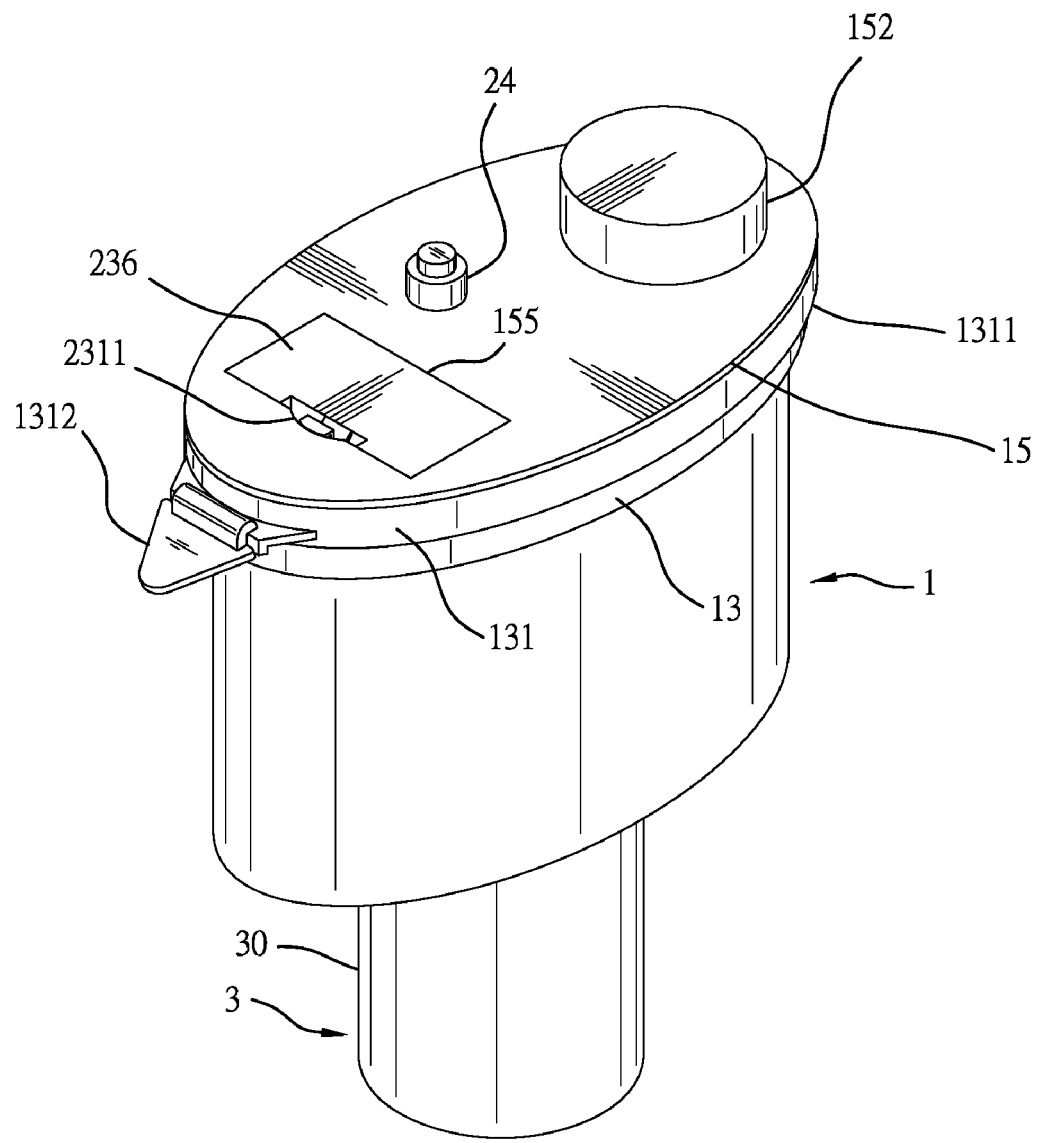
FIG. 4 is an elevational assembly view of FIG. 3.

Referring to FIGS. 1~6, a pressure filter type water kettle in accordance with a first embodiment of the present invention is shown comprising a pressure device holder 1, a pressure device 2, a filter 3, and a kettle body 4.

The pressure device holder 1 is a hollow shell inserted into the kettle body 4, having an engagement portion 13 that is press-fitted into the top open side of the kettle body 4, a stop flange 131 that is stopped with its bottom wall 1311 at the topmost edge of the kettle body 4 after insertion of the pressure device holder 1 into the kettle body 4 (see FIGS. 2 and 5), a tubular bottom coupling flange 12 downwardly extending from the bottom wall thereof and defining a bottom opening 11 for the connection of the filter 3 (see FIG. 5), an accommodation chamber 14 defined therein at the top side, a top cover 15 covered on the top flange 131, a tubular neck 151 located on the top cover 15 (see FIG. 2) for the filling of water and a cap 152 for closing the tubular neck 151.

The pressure device 2 (see FIGS. 3 and 5) comprises a driver 21, an air pump 22, a power supply unit 23 and a control switch 24. The driver 21 (for example, motor) is affixed to a support 142 in the accommodation chamber 14 inside the pressure device holder 1 with fastening members 211 (see FIG. 5). The air pump 22 is affixed to the inside of the accommodation chamber 14 with fastening members 221, having an exhaust tube 222 connected to a through hole 1401 on the bottom wall 140 of the accommodation chamber 14 and kept in communication with the inside space of the pressure device holder 1. The air pump 22 further has an air inlet 223. The control switch 24 is mounted on the top side of the top cover 15, and operable to control the supply of power supply from the power supply unit 23 to the driver 21. The power supply unit 23 according to this embodiment is a battery set mounted in the accommodation chamber 14 of the pressure device holder 1, comprising positive pole metal terminals 232, negative pole metal terminals 233, a plurality of battery cells 230 set in between the positive pole metal terminals 232 and the negative pole metal terminals 233 and kept with the positive and negative poles thereof in positive contact with the positive pole metal terminals 232 and the negative pole metal terminals 233 respectively, two electric wires 234 and 235 respectively electrically connecting the positive pole metal terminals 232 and the negative pole metal terminals 233 to one terminal 241 of the control switch 24 and one pole of the driver 21 and an electric wire 243 connected between the other terminal 242 of the control switch 24 and the other pole of the driver 21.

Figure 5:
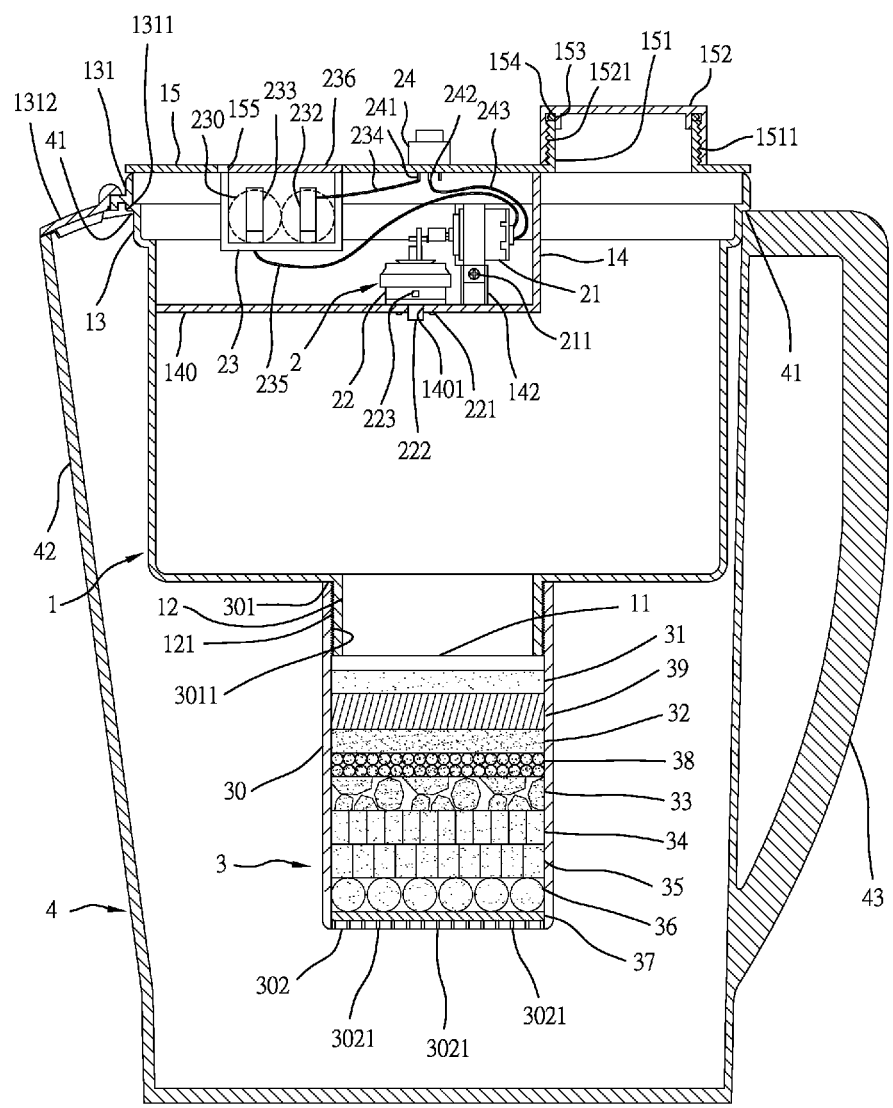
FIG. 5 is a sectional plain view in an enlarged scale of the pressure filter type water kettle in accordance with the first embodiment of the present invention.

The filter 3 comprises a hollow filter body 30 and multiple filter layers 31~39 arranged inside the hollow filter body 30 at different elevations (see FIG. 5). The hollow filter body 30 has a top opening 301 connected to the tubular bottom coupling flange 12 of the pressure device holder 1 by means of, for example, a screw joint, a bottom wall 302, and a plurality of through holes 3021 cut through the bottom wall 302 (see FIG. 5). The filter layers 31~39 include, from the top side toward the bottom side, a ceramic membrane filter layer 31, a hollow fiber membrane filter layer 39, a heavy metal chelating agent-added bamboo charcoal filter layer 32, a fine-grained ion-exchange resin filter layer 38, a grained copper-zinc alloy kinetic degradation fluxion (KDF) filter layer 33, a grained calcium sulfite filter layer 34, a grained alkali trace element filter layer 35, an power stone filter layer 36 and a silver ion-loaded nonwoven fabric filter layer 37.

The kettle body 4 is a top-open water container, having a handle 43 protruded from the periphery at one side, a rim 41 for supporting bottom wall 1311 of the stop flange 131 of the pressure device holder 1, and a spout 42 for pouring water out of the kettle body 4. According to the present preferred embodiment, the kettle body 4 is made of a transparent material.

Further, the tubular neck 151 of the top cover 15 of the pressure device holder 1 has an outer thread 1511 extending around the periphery, and the cap 152 has an inner thread 1521 extending around the inside wall thereof and threaded onto the outer thread 1511 of the tubular neck 151 of the top cover 15 (see FIG. 5). Further, the cap 152 has an inside annular groove 153 and a sealing ring 154 mounted in the inside annular groove 153 and stopped against the topmost edge of the tubular top neck 151 to seal the gap.

Further, the tubular bottom coupling flange 12 of the pressure device holder 1 has an outer thread 121 extending around the periphery, and the filter body 30 has an inner thread 3011 extending around the inside wall in the top opening 301 and threaded onto the outer thread 121 of the tubular bottom coupling flange 12 of the pressure device holder 1.

Further, the power supply unit 23 (battery set) of the pressure device 2 is covered with a detachable battery lid 236. The top cover 15 of the pressure device holder 1 has a recessed hole 155 defined in the accommodation chamber 14. The detachable battery lid 236 has a springy hooks 2361 and locating blocks 2362 respectively engaged in a hook hole 2311 and retaining grooves 2312 in the recessed hole 155. Further, an air vent can be formed in the detachable battery lid 236 or the top cover 15 at a suitable location.

Further, as shown in FIG. 5, the pressure device holder 1 has a lid 1312 pivotally connected to the stop flange 131 for closing the spout 42 of the kettle body 4.

When using the pressure filter type water kettle, remove the cap 152 from the tubular neck 151 of the pressure device holder 1, and then pour water through the tubular neck 151 of the pressure device holder 1 into the filter 3 and then the inside of the kettle body 4. Thereafter, switch on the control switch 24 of the pressure device 2 to electrically connect the power supply unit 23 to the driver 21, causing the driver 21 to move the air pump 22 so that the air pump 22 will pump air through the exhaust tube 222 into the inside space of the pressure device holder 1, thereby forcing the supplied water to flow through the filter 3. At this time, the water filled in the pressure device holder 1 is forced by the compressed air to flow through the ceramic membrane filter layer 31, the hollow fiber membrane filter layer 39, the heavy metal chelating agent-added bamboo charcoal filter layer 32, the fine-grained ion-exchange resin filter layer 38, the grained copper-zinc alloy kinetic degradation fluxion (KDF) filter layer 33, the grained calcium sulfite filter layer 34, the grained alkali trace element filter layer 35, the power stone filter layer 36 and the silver ion-loaded nonwoven fabric filter layer 37, and therefore impurities, germs and heavy metal substances are removed from water. The ceramic membrane filter layer 31 is made of silver ion-loaded diatomite through a sintering process, having filter apertures about 0.5 µm that remove germs, bacteria and other microbes effectively. The microbes filtering efficiency of the ceramic membrane filter layer 31 is as high as 99.99% up. When the water is flowing through the hollow fiber membrane filter layer 39, bacteria, microbes and solid impurities carried in the water are removed by the hollow fiber membrane filter layer 39. When the water flows through the heavy metal chelating agent-added bamboo charcoal filter layer 32 that is made of compressed bamboo charcoal and added with a heavy metal chelating agent, chloroform, toxic chemical substances, volatile organic compounds (Vocs), iron rust, bad smell, heavy metals and pesticide are removed from the water. When the water flows through the fine-grained ion-exchange resin filter layer 38, the fine-grained ion-exchange resin filter layer 38 absorbs lime from the water so that the water is changed from hard water into soft water. When the water flows through the grained copper-zinc alloy kinetic degradation fluxion (KDF) filter layer 33, the grained copper-zinc alloy kinetic degradation fluxion (KDF) filter layer 33 regulates the Ph value of the water, lowering the concentration of calcium and magnesium ions in the water, prohibition growth of germs and fungi, and removing water soluble heavy metals, such as lead, iron, cadmium, aluminum, and other inorganic substances. When the water flows through the grained calcium sulfite filter layer 34, the heat-resistant 98% high purity calcium sulfite effectively removes chloride from the water. When the water flows through the grained alkali trace element filter layer 35 that is prepared from deep-sea minerals and volcano rocks and minerals through a biochemical technology recombination and sintering process effectively converts the water into alkaline ionic water. When the water flows through the power stone filter layer 36, the power stone filter layer 36 cuts the clusters of the water molecules of sizes from 13~16 molecules into sizes of 5~6 molecules, enhancing water activity so that filtered water can effectively carry pollutants away from the human body cells, animal cells, or plant cells. Further, the power stone of the power stone filter layer 36 emits far infrared rays, and is prepared from a tourmaline powder and clay mixture through a sintering process. When the water flows through the silver ion-loaded nonwoven fabric filter layer 37, the active silver ions of the silver ion-loaded nonwoven fabric filter layer 37 rapidly bind the sulfur-hydrogen groups of the enzyme protein in bacteria, causing the enzyme to lose its activity. Therefore, the silver ion-loaded nonwoven fabric filter layer 37 effectively kills bacteria, such as *E. coli, staphylococcus aureus* bacteria, *salmonella enterica* and *pseudomonas aeruginosa*. Further, the silver ion-loaded nonwoven fabric filter layer 37 is non-toxic and free from the effects of acids and alkalis, does not cause any drug resistance or allergic effect.

Further, the filter 3 can be formed of one of the ceramic membrane filter layer 31, the hollow fiber membrane filter layer 39, the heavy metal chelating agent-added bamboo charcoal filter layer 32, the fine-grained ion-exchange resin filter layer 38, the grained copper-zinc alloy kinetic degradation fluxion (KDF) filter layer 33, the grained calcium sulfite filter layer 34, the grained alkali trace element filter layer 35, the power stone filter layer 36 and the silver ion-loaded nonwoven fabric filter layer 37, or their combination.

Figure 6:
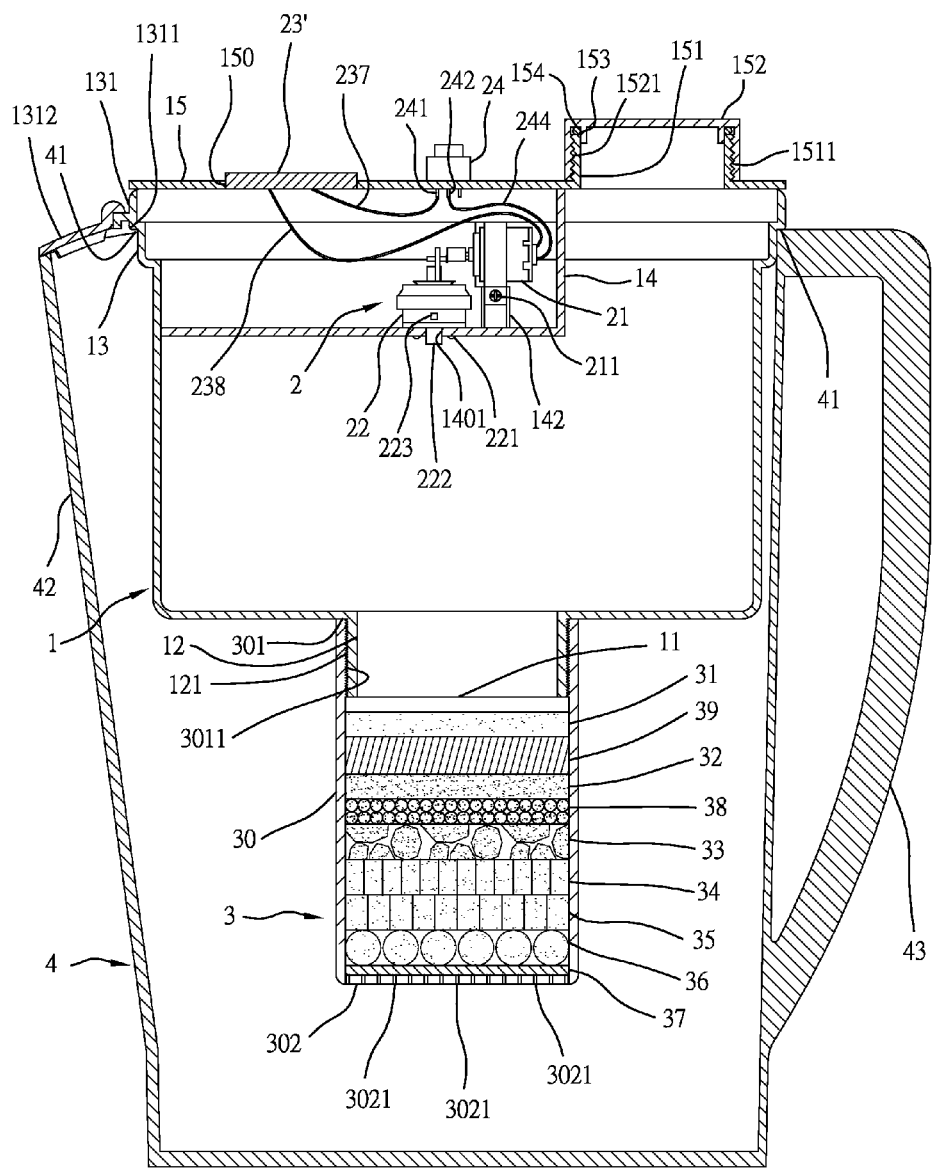
FIG. 6 is a sectional plain view of a pressure filter type water kettle in accordance with a second embodiment of the present invention.

FIG. 6 illustrates a pressure filter type water kettle in accordance with a second embodiment of the present invention. This second embodiment is substantially similar to the aforesaid first embodiment with the exception of the use of a solar panel 23' to substitute for the aforesaid power supply unit 23. The solar panel 23' is mounted in a hole 150 on the top cover 15 of the pressure device holder 1, having two electric wires 237 and 238 respectively electrically connected to one terminal 241 of the control switch 24 and one pole of the driver 21.

The other terminal 242 of the control switch 24 is electrically connected to the other pole of the driver 21 by an electric wire 244.

Figure 7:
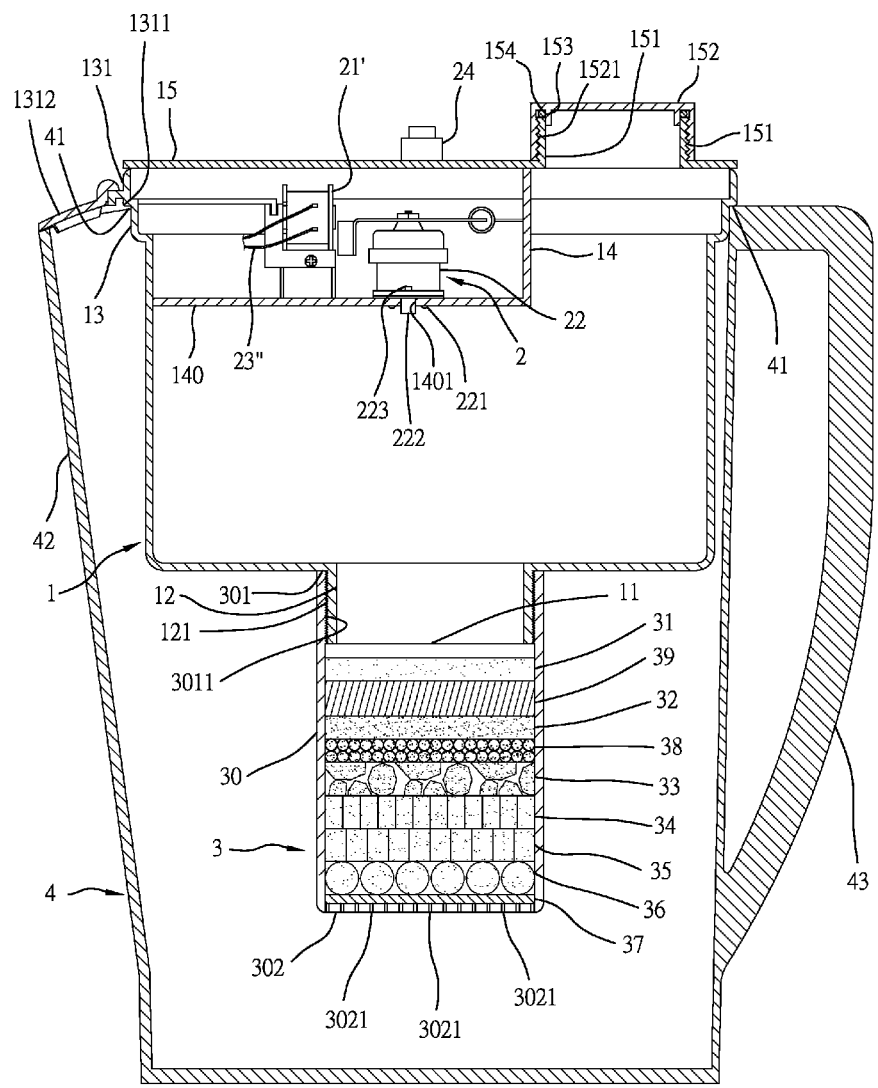
FIG. 7 is a sectional plain view of a pressure filter type water kettle in accordance with a third embodiment of the present invention.

FIG. 7 illustrates a pressure filter type water kettle in accordance with a third embodiment of the present invention. This third embodiment is substantially similar to the aforesaid first embodiment with the exception of the use of an AC power cable 23" to substitute for the aforesaid power supply unit 23, and the use of an electromagnet 21' to substitute for the aforesaid driver (motor) 21. The electromagnet 21' is connected to the power cable 23" to obtain the necessary working voltage from city power supply for moving the air pump 22.

In general, the pressure filter type water kettle of the present invention has the following advantages:

1. By means of operating the pressure device 2, water in the kettle body 4 is forced to permeate through the filter layers 31~39. Thus, water in the kettle body 4 is well filtered for drinking.

2. The pressure filter type water kettle is convenient for use at home, in office, or at any place to filter city water or mountain water into a drinking condition.

3. The use of the pressure filter type water kettle is environment friendly. Because filtered water is drinkable, no further boiling is necessary. Therefore, the invention helps energy-saving and carbon dioxide reduction.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pressure filter type water kettle, comprising:
a kettle body for holding water, said kettle body comprising a rim around a top opening thereof;
a pressure device holder being a hollow shell, said pressure device holder comprising an accommodation chamber, a top cover, an engagement portion press-fitted into the top opening of said kettle body, a stop flange stopped at the rim of said kettle body, a tubular bottom coupling flange downwardly extending from a bottom wall thereof and defining a bottom opening, a tubular neck upwardly extended from said top cover in communication with said bottom opening and a cap for closing said tubular neck;
a pressure device, said pressure device comprising a driver, an air pump, a power supply unit and a control switch, said driver being mounted on a support inside said accommodation chamber, an air pump mounted in said accommodation chamber and movable by said driver to pump air, said air pump having an air inlet for taking in air and an exhaust tube connected to a through hole on a bottom wall of said accommodation chamber for guiding pumped air out of said air pump toward said bottom opening of said pressure device holder, said power supply unit being electrically connected to said driver through said control switch for providing power supply to said driver for working, said control switch being mounted on the top cover of said pressure device holder and electrically connected between said power supply unit and said driver and controllable to switch on/off the connection between said power supply unit and said driver; and a filter, said filter comprising a hollow filter body and multiple filter layers arranged inside said hollow filter body at different elevations, said hollow filter body comprising a top opening connected to the tubular bottom coupling flange of said pressure device holder and a plurality of through holes cut through a bottom wall.

2. The pressure filter type water kettle as claimed in claim 1, wherein said power supply unit comprises a battery pack having a plurality of positive pole metal terminals and negative pole metal terminals, a plurality of battery cells set in between said positive pole metal terminals and said negative pole metal terminals, two first electric wires respectively electrically connecting said positive pole metal terminals and said negative pole metal terminals to one terminal of said control switch and one pole of said driver and a second electric wire connected between an opposite terminal of said control switch and an opposite other pole of said driver.

3. The pressure filter type water kettle as claimed in claim 1, wherein said power supply unit comprises a solar panel, two first electric wires respectively electrically connecting one pole of said solar panel to one terminal of said control switch and one pole of said driver and a second electric wire connecting an opposite terminal of said control switch to an opposite pole of said driver.

4. The pressure filter type water kettle as claimed in claim 1, wherein said power supply unit comprises an AC power cable for obtaining city power supply, an electromagnet connected to said AC power cable to obtain the necessary working voltage and adapted for moving said air pump.

5. The pressure filter type water kettle as claimed in claim 1, wherein said filter comprises at least one filter layer selected from the group of a ceramic membrane filter layer, a hollow fiber membrane filter layer, a heavy metal chelating agent-added bamboo charcoal filter layer, a fine-grained ion-exchange resin filter layer, a grained copper-zinc alloy kinetic degradation fluxion (KDF) filter layer, a grained calcium sulfite filter layer, a grained alkali trace element filter layer, a power stone filter layer and a silver ion-loaded nonwoven fabric filter layer.

6. The pressure filter type water kettle as claimed in claim 1, wherein said cap is fastened to said tubular neck of said top cover of said pressure device holder by means of a screw joint.

7. The pressure filter type water kettle as claimed in claim 1, wherein said cap comprises an inside annular groove and a seal ring mounted in said inside annular groove and stopped against said tubular neck of said top cover of said pressure device holder.

8. The pressure filter type water kettle as claimed in claim 1, wherein said tubular bottom coupling flange of said pressure device holder has an outer thread extending around the periphery thereof; said filter body has an inner thread threaded onto the outer thread of said tubular bottom coupling flange of said pressure device holder.

9. The pressure filter type water kettle as claimed in claim 1, wherein said kettle body comprises a spout for pouring water out of said kettle body.

10. The pressure filter type water kettle as claimed in claim 1, wherein said kettle body comprises a handle protruded from the periphery thereof at one lateral side.

* * * * *